Dec. 13, 1960 N. T. VAN VOORST 2,964,068
COIL WINDING MECHANISM
Filed Dec. 12, 1955 4 Sheets-Sheet 4
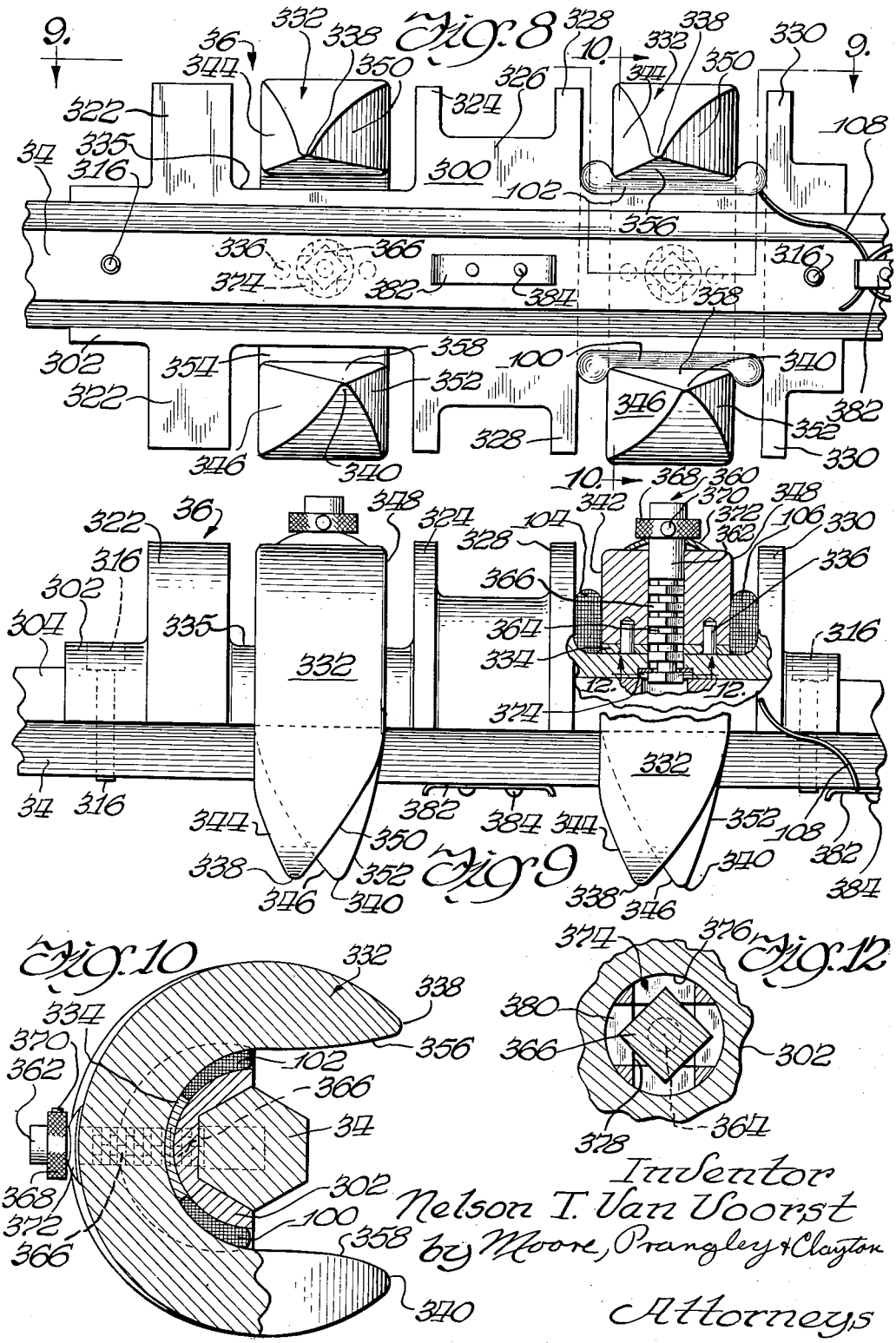
Inventor
Nelson T. Van Voorst
by Moore, Prangley & Clayton
Attorneys United States Patent Office 2,964,068
Patented Dec. 13, 1960

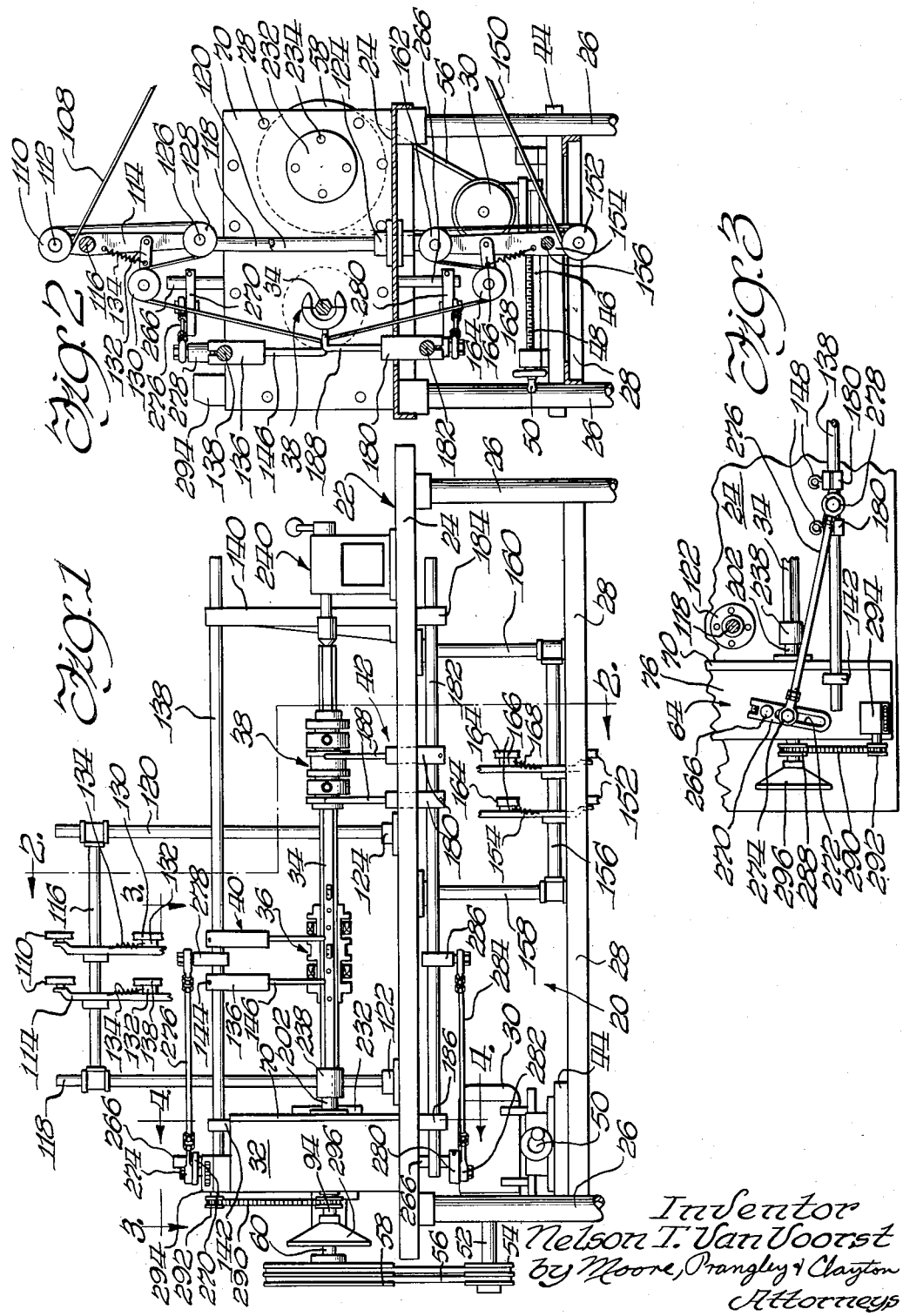

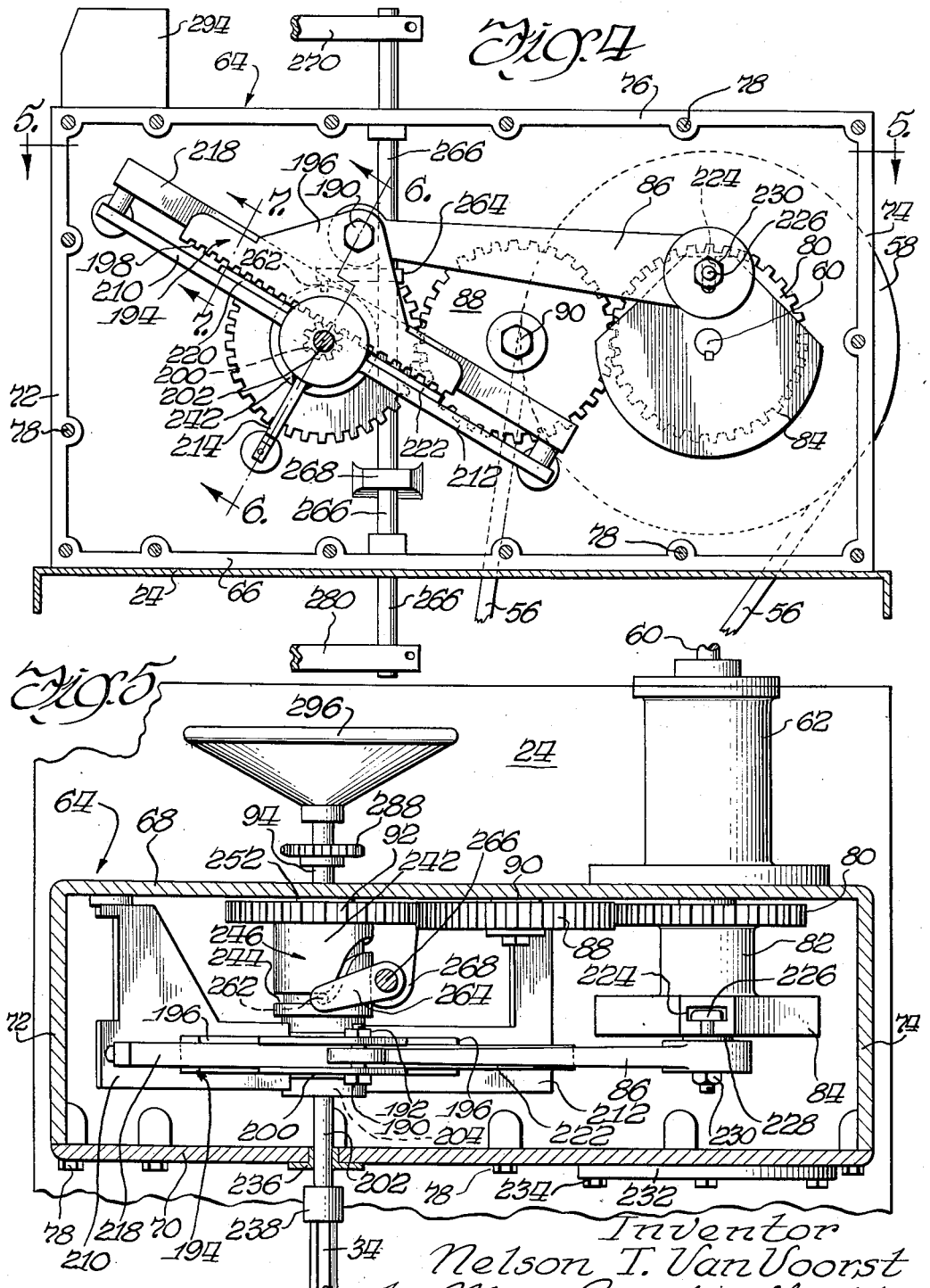

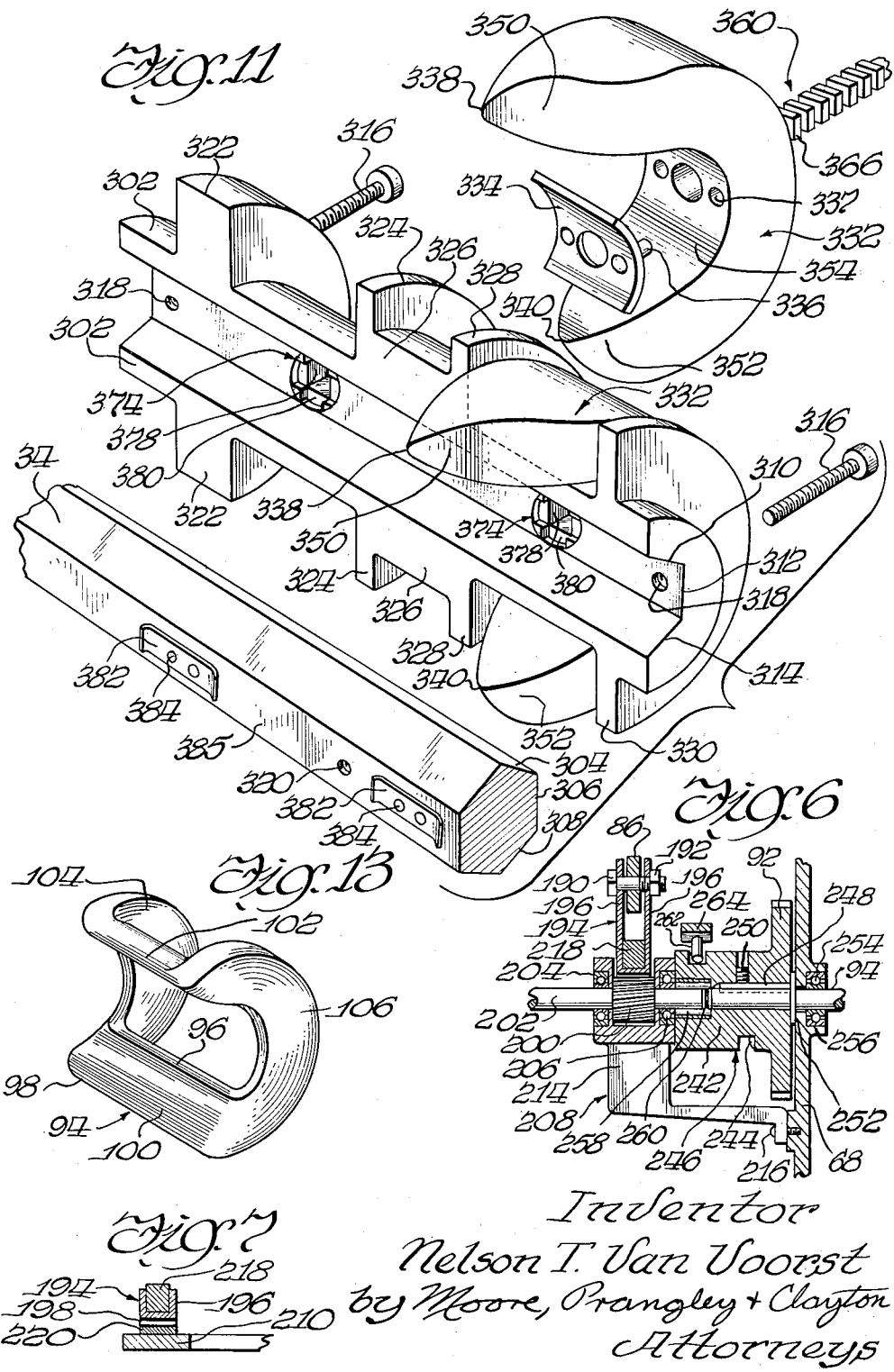

2,964,068
COIL WINDING MECHANISM

Nelson T. Van Voorst, Chicago, Ill., assignor to Geo. Stevens Manufacturing Company, Chicago, Ill., a corporation of Illinois Filed Dec. 12, 1955, Ser. No. 552,612

15 Claims. (Cl. 140—92.2)

This invention relates to apparatus and machines for winding coils and particularly to coil winding machines that can wind a plurality of coils having relatively complicated shapes in a rapid and economical manner.

The present invention provides coil winding machines which are adapted to wind continuous wire coils, including a plurality of superimposed closed loops of wire, each loop having a complicated configuration, i.e., each loop does not lie in a single plane. In coils of this type each successive loop has a slightly different shape and a different size.

An important object of the invention is to provide an improved coil winding machine for winding coils of the type set forth; more particularly it is an object of the invention to provide a machine which can more quickly and more economically wind coils of the type described.

Another object of the invention is to provide a coil winding machine for winding coils of the type set forth, the finished coils being accurately wound, uniform in shape and closely packed.

Yet another object of the invention is to provide a coil winding machine which can wind simultaneously a plurality of coils of the type described and more particularly a machine which can wind different sizes and shapes of coils of the type described simultaneously.

Still another object of the invention is to provide a machine of the type set forth which can be readily adjusted and changed to wind coils of different shapes and sizes.

Yet another object of the invention is to provide in a coil winding machine of the type set forth an improved form upon which to wind the coil including improved quickly operable means permitting wound coils to be removed therefrom easily and rapidly.

These and other objects and advantages of the invention will be better understood from the following description when taken in conjunction with the accompanying drawings. In the drawings wherein like reference numerals have been used to designate like parts throughout:

Figure 1 is a side elevational view of a coil winding machine made in accordance with and embodying principles of the present invention;

Figure 2 is a view in vertical section of the machine shown in Figure 1 substantially as seen in the direction of the arrows along the line 2—2 of Figure 1;

Figure 3 is a partial plan view with certain parts in section substantially as seen in the direction of the arrows along the line 3—3 of Figure 1;

Figure 4 is an enlarged view in vertical section through the drive mechanism substantially as seen in the direction of the arrows along the line 4—4 of Fig. 1;

Figure 5 is a view in horizontal section substantially as seen in the direction of the arrows along the line 5—5 in Figure 4;

Figure 6 is a view in section through a portion of the drive mechanism substantially as seen in the direction of the arrows along the line 6—6 in Figure 4;

Figure 7 is a view in section substantially as seen in the direction of the arrows along the line 7—7 of Figure 4;

Figure 8 is an enlarged view showing one of the winding forms used in the machine of Figure 1;

Figure 9 is a view partly in section of the winding form of Figure 8 substantially as seen in the direction of the arrows along the line 9—9 of Figure 8;

Figure 10 is a view in vertical section through the winding form of Figure 8 substantially as seen in the direction of the arrows along the line 10—10 of Figure 8;

Figure 11 is an exploded view in perspective of the parts of the winding form;

Figure 12 is a partial enlarged view in section through the winding form illustrated in Figure 9 substantially as seen in the direction of the arrows along the line 12—12 of Figure 9;

Figure 13 is a perspective view of a television focus coil which can be wound using the coil winding machine and the winding form of the present invention.

Referring to Figures 1 to 7 of the drawings there is shown a coil winding machine generally designated by the numeral 20 made in accordance with and embodying the principles of the present invention. The various parts of the coil winding machine 20 are mounted upon a support or table 22 including a top 24 which is supported by four legs 26 interconnected by angle iron braces 28. Mounted upon table 22 are the various parts of the coil winding machine 20 including the drive motor 30, drive mechanism 32, the winding shaft 34, a pair of winding forms 36 and 38 and a pair of wire guides 40 and 42 which cooperates with the winding forms 36 and 38, respectively.

Referring specifically to Figures 1 and 2 it will be seen that the drive motor 30 is mounted upon a base 44 which is in turn supported by brace 28. A pair of rods 46 positioned upon base 44 slidingly receive and support motor 30. A threaded rod 48 is rotatably mounted upon base 44 and threadedly engages motor 30 to move motor 30 along rods 46. A handle 50 is provided at one end of threaded rod 48 to turn it and thereby move and position motor 30.

Motor 30 is provided with an output shaft 52 carrying a double pulley 54. Pulley 54 receives and drives a pair of belts 56 which in turn drive a double pulley 58. Pulley 58 is fixedly attached to a main drive shaft 60 (see Figures 4 and 5 also) which provides the operating power for the entire coil winding machine.

The main drive shaft 60 is mounted upon and rotatably journaled in a member 62 (see Figure 5) which is fixedly attached to one wall of a housing generally designated by the numeral 64 which surrounds the drive mechanism 32. Housing 64 is mounted upon the table top 24 and includes a bottom 66, a rear wall 68, a front wall 70, a pair of side walls 72 and 74 and a top 76. The front wall 70 is formed as a separate piece and is mounted on the remaining portion of housing 64 by a plurality of screws 78. Member 62 is secured as by welding to the rear wall 68 of housing 64 and the main drive shaft extends through wall 68 into the interior of housing 64.

Mounted on the end of the main drive shaft 60 extending into housing 64 is a gear 80 having a hub 82 secured to shaft 60 to be driven thereby. Secured to hub 82 such as by welding is a crank 84 which is adapted to drive a lever 86. Gear 80 meshes with and drives an idler gear 88 which is rotatably supported by a shaft 90 mounted on rear wall 68. Idler gear 88 in turn meshes with a gear 92 which is mounted upon a shaft 94 (see Figure 6). The lever 86, through a drive mechanism which will be described later, serves to oscillate the winding shaft 34 whereby to impart oscillatory winding movement to the winding forms 36 and 38. Gear 92 serves to drive a mechanism to be described later which imparts the necessary reciprocatory motion to the wire guides 40 and 42.

The coils to be wound are progressively formed and wound upon the winding forms 36 and 38. These forms, which will be described in detail later, are illustrated as being adapted to wind a coil of the form shown in Figure 13 of the drawings and generally designated by the numeral 94. Coil 94 is made up of a plurality of closed loops. The first closed loop wound on the coil is the smallest and innermost loop which is designated by the numeral 96. Loop 96 extends completely around the inner periphery of coil 94. Each successive loop is slightly larger, the last coiled loop being indicated by the numeral 98, and being the largest loop comprising coil 94. Superimposed layers of loops at the point designated by the numeral 100 from a relatively straight and flat coil section. A similarly formed substantially flat coil section 102 is formed opposite coil section 100. The joining coil sections 104 and 106 are part circular in shape and join adjacent ends of coil sections 100 and 102.

Wire to be wound upon coil form 36 has been designated by the numeral 108 (see Figure 2) and is derived from a source (not shown). A wire 108 is fed to each of the two sections comprising winding form 38 and therefore two feed and guide mechanisms are provided. Each of the feed and guide mechanisms is identical with the other and accordingly only one will be described in detail, the same reference numerals being applied to both. Wire 108 passes over a guide pulley 110 rotatably mounted by a shaft 112 on one end of a support arm 114. Arm 114 is pivotally carried by a rod 116 which is in turn supported by a pair of rods 118 and 120 fixedly attached to table top 24 by a pair of fittings 122 and 124, respectively. The lower end of arm 114 carries a shaft 126 which rotatably supports a pulley 128. After passing over pulley 110 the wire 108 passes under pulley 126 and then upwardly and over a pulley 130 rotatably mounted upon an arm 132 which is in turn pivoted upon arm 114. A spring 134 continuously urges arm 132 and pulley 130 upwardly to maintain a desired tension upon wire 108. From pulley 130 wire 108 passes through one of the wire guides 40. Each wire guide 40 includes an attachment portion 136 which clamps upon a wire guide support rod 138. Rod 138 is slidably mounted by a frame member 140 at one end thereof and by a bearing member 142 at the other end, member 140 being mounted upon and supported by table top 24 and member 142 being mounted upon housing 64 for drive mechanism 32. A tightening screw 144 permits attachment portion 136 to be mounted upon rod 138 at any desired position thereon. Extending downwardly from attachment 136 is a member 146 which carries at its lower end an eye or guide 148 through which the wire 108 passes to winding form 36.

A pair of wires 150 (see Figure 2) to be wound upon winding form 38 is provided from a source (not shown). A tension mechanism for wires 150 is provided identical with that described above but positioned up side down with respect thereto. Since both tension mechanisms for use with wires 150 are identical, like reference numerals have been applied to both and only one will be described in detail. The wire 150 passes over a pulley 152 rotatably supported upon one end of an arm 154. Arm 154 is rotatably supported by a rod 156 which is in turn supported from table top 24 by a pair of rods 158 and 160. The other end of arm 154 is provided with a pulley 162 about which wire 150 passes. From pulley 162 wire 150 passes to a third pulley 164 rotatably mounted upon an arm 166 which is pivoted upon arm 154. A spring 168 extends from arm 166 to arm 154 to urge pulley 164 in a direction to maintain the desired tension in the wire 150.

Wire 150 passes from the tension mechanism to the wire guides 42. Two wire guides 42 have been provided and are identical in construction; accordingly, like reference numerals have been applied to both of the wire guides in this set. Each wire guide 42 includes an attachment portion 180 which is clamped upon a sliding rod 182. One end of rod 182 is slidably received in a member 184 mounted on table top 84 and the other end of rod 182 is slidably received by a member 186 mounted on table top 24. Attachment member 180 can be fixedly positioned upon rod 182 at any desired point thereon and it is to be noted that attachment member 180 extends vertically upwardly. Attachment member 180 carries a member 188 which at its end carries an eye or guide similar to the guide 148 described above.

The coils 94 are wound upon the winding forms 36 and 38 by imparting the necessary motion to winding shaft 34 and the two support rods 138 and 182 which carry wire guides 40 and 42, respectively. More specifically, shaft 34 must be periodically oscillated through an angle of approximately 330 degrees to form coil 94 and at proper predetermined times the wire guide support rods 138 and 182 must be slidably reciprocated.

The mechanism for oscillating winding shaft 34 330 degrees is best illustrated by reference to Figures 4, 5 and 6 of the drawings. As has been described above, the main drive shaft 60 continuously rotates in one direction and drives crank 84 continuously in the same direction. Lever 86 which is attached to crank 84 at a point spaced from the center of revolution thereof is also driven. The other end of lever 86 is connected by means of a bolt 190 and a nut 192 to a rack generally designated by the numeral 194. Rack 194 includes a pair of side plates 196 which receive bolt 190 to form a pivotal connection with lever 86. The lower ends of side plates 196 carry a toothed rack 198 which meshes with a gear 200 fixedly attached to a shaft 202. Shaft 202 is supported by a pair of ball bearings 204 and 206 (see Figure 6) which are mounted in and supported by a bracket generally designated by the numeral 208. Bracket 208 is provided with three legs 210, 212 and 214 which are suitably secured as by screws 216 to the rear wall 68 of housing 64.

In order to steady and guide the action of rack 194 a guide bar 218 is fixed to legs 210 and 212 of bracket 208 and extends between the side plates 196 of rack 194. A pair of slide plates 220 and 222 are also carried by legs 210 and 212, respectively, and underlie and support the rack tooth 198 on either side of gear 200.

By reference to Figure 4 of the drawings it will be seen that the path of the tooth rack 194 is inclined whereby rack 194 is reciprocated when crank 84 is continuously turned in one direction. By choosing the proper gear ratio between the rack teeth 198 and gear 200, and by choosing the proper inclination of rack 194, shaft 202 can be caused to turn any desired number of degrees of revolution. With these parts fixed as illustrated in Figure 4, shaft 202 is rotated approximately 330 degrees.

Means is provided to adjust within limits the degree of rotation of shaft 202 by adjusting the point of attachment of lever 86 to crank 84. To this end a T-shaped slot 224 is provided in crank 84 (see Figure 5) and the head of a bolt 226 is received therein. The threaded end of bolt 226 extends outwardly from slot 224 and passes through a washer 228 and the adjacent end of lever 86. A nut 230 engages the outer threaded end of bolt 226 whereby to tighten and adjust the position of bolt 226 within slot 224 and, accordingly, the point of attachment of lever 86 to crank 84. With bolt 226 positioned substantially half way out in slot 224 as shown in Figure 4, shaft 202 is rotated through approximately 330 degrees. By moving bolt 226 radially inwardly within slot 224 toward shaft 60, the effective throw of lever 86 is reduced whereby to reduce the degrees of revoluation of shaft 202. Alternatively, by moving 226 outwardly away from shaft 60 within slot 224, the effective movement of lever 86 is increased whereby to turn shaft 202 more than 330 degrees.

In order to make access to adjusting bolt 226 and nut 230 easy, an opening is provided in front wall 70, this opening being closed by a plate 232 held in position by a plurality of bolts 234 when the machine is in operation.

Referring to Figure 5 of the drawings it will be seen that shaft 202 extends outwardly through front wall 70 and is supported in front wall 70 by a bushing 236. The outer end of shaft 202 carries a sleeve 238 which has a hexagonal recess formed therein to receive one end of the winding shaft 34. The other end of winding shaft 34 is received upon a tail stock assembly 240 mounted upon table top 24 (see Figure 1).

By the above described mechanism winding shaft 34 can be accurately and continuously oscillated through an angle of approximately 330 degrees, the angle of oscillation being adjustable.

The mechanism for oscillating the wire guide support rods 138 and 182 will now be described. Referring to Figures 4 and 5, gear 80 attached to the main drive shaft 60 drives the idler gear 88 which in turn drives gear 92. Gear 92 is formed integrally with a hub 242 in which is formed a cam track 244 which is continuous to provide a barrel cam generally designated by the numeral 246. Barrell cam 246 and the integral driving gear 92 are primarily mounted upon shaft 94 (see Figure 6). More specifically, a key slot is provided in both shaft 94 and the barrel cam 246 to receive a key 248 which is held in position therein by set screw 250. A washer 252 is disposed between gear 92 and the adjacent wall 68 of housing 64 to facilitate rotation of gear 92 and barrel cam 246. Shaft 94 also is supported by a ball bearing assembly 254 positioned in an embossment 256 formed on the outside of rear wall 68. Indirect support for shaft 94 is provided through hub 242 which is supported by a needle bearing 258 positioned therein and receiving one end of shaft 202. In order to prevent interference between shaft 94 and shaft 202, a thrust bearing 260 is provided between these two shafts.

Positioned within cam track 244 is a cam follower 262 which rides therein and is driven thereby. Cam follower 262 is supported by an arm 264 which is fixedly attached to a vertically disposed shaft 266. Shaft 266 passes through bottom 66 and top 76 of housing 64 and is further supported by a bearing block 268 cast on the inner side of rear wall 68. Engagement of cam follower 262 in cam track 244 causes shaft 266 to be oscillated about its longitudinal axis when barrel cam 246 is rotated.

Movement of shaft 266 is transmitted to the reciprocating wire guide support rod 138 by a linkage which will now be described. Referring particularly to Figures 1, 2 and 3 of the drawings, it will be seen that the upper end of the oscillating shaft has attached thereto a lever 270 which is fixedly attached thereto but is adjustable thereon. Formed in lever 270 is an elongated slot 272 through which passes a connecting member 274 which provides a pivotal connection between lever 270 and a drive link 276. A second pivotal connection 278 connects the other end of link 276 to wire guide support rod 138. The length of stroke of support rod 138 is adjustable by moving connecting member 274 along slot 272. The farther out the connecting member 274 is in slot 272 the longer the path of travel of the support rod 128 and vice versa. A second set of linkage generally similar to the linkage interconnecting shaft 266 and rod 138 interconnects shafts 266 and rod 182. More specifically a lever 280 similar in construction to lever 270 is clampingly and adjustably connected to the lower end shaft 266. Lever 280 is provided with an elongated slot (not shown) which receives a connecting member 282. Connecting member 282 pivotally interconnects lever 280 and a drive link 284. A second connecting member 286 pivotally connects the other end of link 284 and wire guide support rod 182.

By the above described drive mechanisms, proper motion can be imparted to the winding forms 36 and 38 and the wire guides 40 and 42 to wind a coil like coil 94 of Figure 12 upon the winding forms 36 and 38. Because drive links 276 and 284 are individually adjustable independent of each other, different sizes and/or shapes of coils can be wound upon winding form 36 while operating winding form 38. This permits a large degree of flexibility in the operation of the winding machine.

It is desirable to know the number of turns of wire wound upon the coils and it is further desired often to control the operation of the winding machine automatically whereby to stop the machine when a predetermined number of turns have been wound upon the winding forms 36 and 38. To this end an extension of shaft 94 behind wall 68 carries a sprocket wheel 288 which drives a chain 290 (see Figures 1 to 5). Chain 290 drives a sprocket 292 mounted on the input shaft of a counter 294 mounted on top of housing 64. It further is desirable to position the parts and particularly the wire guides 40 and 42 at a predetermined starting position which may be different from the stopping position. To permit accurate and manual positioning of the wire guides 40 and 42 a hand wheel 296 has been provided on the outermost rear end of shaft 94.

Referring now particularly to Figures 8, 9, 10, 11 and 12 of the drawings the construction and operation of the winding forms 36 and 38 will be described. The construction of winding forms 36 and 38 is identical and, accordingly, only the construction of winding form 36 will be fully described and like reference numerals will be applied to like parts of both winding forms 36 and 38.

Mounted upon winding shaft 34 is an inner winding member 300 which forms a part of winding form 36. Winding member 300 has an inner part cylindrical portion 302 which has the outer periphery thereof formed substantially as a half of a cylinder. The inner surface, i.e., the surface lying against winding shaft 36, is formed as half of a hexagon and conforms to the outer periphery of winding shaft 34. As may be best seen in Figure 11, winding shaft 34 has a cross section which is a regular hexagon. Winding member 300 overlies and covers three adjacent faces of winding shaft 34. More specifically, winding shaft 34 has faces 304, 306 and 308 which fit and coact with faces 310, 312 and 314, respectively, on portion 302. A pair of bolts 316 pass through apertures 318 in portion 302 and threadedly engage threaded apertures provided in winding shaft 34.

Disposed along the axis of portion 302 is a plurality of flanges. More specifically, a radially extending semicircular flange 322 extends outwardly from portion 302 adjacent the left hand end thereof as viewed in Figures 8, 9 and 11. Spaced from flange 322 and extending outwardly from portion 302 and adjacent to the middle thereof is a second flange 324 which is formed integral with an enlarged portion 326 formed on portion 302. On the other side of enlarged portion 326 is formed a third outwardly extending half cylindrical flange 328 which is spaced from a fourth outwardly extending half cylindrical flange 330. One of the coils to be wound is formed between flanges 322 and 324 and the other coil to be wound is formed between flanges 328 and 330. In this manner two coils can be wound simultaneously upon winding form 36.

Mounted upon part cylindrical portion 302 between flanges 322 and 324 is an outer removable winding member 332. Member 332 serves to shape the inner periphery and the outer ends of the coil to be wound. In order to insure proper positioning of member 332 upon the inner winding member, a mounting plate 334 is provided which is curved to conform to the shape of surface 335 between flanges 322 and 324 and is provided with a pair of pins 336 which extend into apertures 337 in form member 332.

The outer removable winding member positioned between flanges 328 and 330 is identical with member 332 and, accordingly, like reference numerals have been used designating like parts thereof. Referring to Figure 10 it will be seen that in cross section the outer removable members 332 are substantially U-shaped and are provided with pointed ends 338 and 340. Ends 338 and 340 are offset from each other as may be seen in Figures 8 and 9, end 338 being positioned to the left and end 340 to the right. Referring again to Figure 10, it will be seen that the major portion of the outer removable member 332 is formed as half of a hollow cylinder with the ends 338 and 340 extending outwardly therefrom.

The coil sections 104 are formed between flange 322 or 328, as the case may be, and the adjacent flat substantially semicircular surface 342 on removable member 332. A guide face 344 interconnects end 338 and surface 342 and a longer guide surface 346 interconnects end 340 and surface 342. Coil section 106 is formed between flange 330 and the adjacent half circular surface 348 of the outer member 332. A longer guide surface 350 interconnects end 338 and surface 348 and a shorter guide surface 352 interconnects end 340 and surface 348.

Coil sections 100 and 102 are formed between the inner surface 354 of outer member 332, the outer surface 335 of portion 302, and mounting member 334 (see Figure 10). End 338 is provided with a curved inner surface 356 which guides wire toward coil section 102 and end 340 has an inner guide surface 358 which guides wire to coil section 100.

The outer removable winding member 332 is connected to the inner portion by a quickly operable connector generally designated by the numeral 360. Connector 360 includes a cylindrical outer shank portion 362 and a shank portion 364 of reduced diameter. Formed upon shank portion 364 is a plurality of square locking heads 366, six locking heads having been shown for purposes of illustration. Locking heads 366 are formed square in cross section as may be best seen in Figure 12 and have a relatively small thickness. The distance between opposite corners of locking heads 366 is substantially equal to the diameter of the shank portion 362. A cylindrical knurled head 368 is positioned upon shank 362 and is held in position thereon by a set screw 370. A spring washer 372 is positioned between knurled head 368 and the adjacent surface of outer winding member 332.

Shank 362 and locking heads 366 extend through an aperture in portion 302 whereby the outer locking head 366 cooperates with a locking nut generally designated by the numeral 374. Nut 374 is generally circular in shape and is press fitted into a circular recess formed in portion 302. Formed in the center of locking nut 374 is a square aperture 378 which is slightly larger than the square locking heads 366. A plurality of recesses 380 is formed in locking nut 374, the width of recesses 380 being equal to the length of a side of aperture 378. Connector 360 is inserted in the apertures in members 332 and 334 with locking head 366 in alignment with the square shaped aperture 378 in the locking nut 374. Knurled head 368 is positioned upon shank 362 so that the spring washer 372 must be placed under compression to permit locking head 366 to clear the lock nut 374. When the outermost locking head 366 has cleared lock nut 374, the connector 360 is rotated 45 degrees to the position shown in Figure 12 of the drawings. When knurled head 368 is released, spring 72 will move the outermost locking head 366 into the recessed portions 480 of locking nut 374. This serves to mount member 332 upon portion 302. By a simple turning of knurled head 368, the connector 360 can be quickly withdrawn whereby to remove winding member 332.

In starting a winding operation, the free end of the wire to be wound is connected to the winding shaft 34. To this end a spring member 382 is secured as by fasteners 384 on the surface 385 of winding shaft 84 opposite surface 306. The free end of the wire to be wound, such as wire 108 in Figures 8 and 9, is wrapped once around spring 382 whereby firmly to anchor that end of the wire during operation. A separate spring 382 is provided for each of the winding members 332.

A complete winding operation will now be described in detail. The free end of a wire from a source (not shown) is passed around the pulleys 110, 128 and 130 (see Figures 1 and 2), through the wire guide 148 and wrapped around one of the springs 382 (see Figure 8). This same operation is performed for each winding member 332 on both winding forms 36 and 38. If necessary hand wheel 296 is turned to position the wire guides 40 and 42 at the proper point. Motor 39 is then started whereby the drive mechanism described above oscillates winding shaft 34, 330 degrees about its axis while wire guides 40 and 42 are reciprocated longitudinally beside the winding forms. After a predetermined number of turns has been wound upon the winding forms as determined by the counter 294, the winding operation is stopped and the wire to each coil is broken. Each of the four quickly operable connectors 360 is then removed thereby to remove outer winding members 332 from the inner winding members 300. This permits the removal of the wound coils after which the outer winding members 332 are replaced upon inner winding members 300 and the operation repeated.

It will be seen that there has been provided a coil winding machine and an improved winding form which fulfill the objects and advantages set forth above. Although a certain preferred form of the invention has been shown for purposes of illustration, it is to be understood that various changes and modifications can be made therein without departing from the spirit and scope thereof. Accordingly, the invention is to be limited only as set forth in the following claims.

I claim:

1. A coil winding machine comprising a winding shaft mounted for rotation about an axis, a first winding form mounted upon said shaft, a second winding form mounted upon said shaft and spaced from said first winding form, a first wire guide mounted adjacent said first winding form for reciprocation in a direction parallel to the axis of rotation of said winding shaft, a second wire guide mounted adjacent said second winding form for reciprocation in a direction parallel to the axis of rotation of said shaft, drive mechanism to oscillate said winding shaft about its axis of rotation and to reciprocate said wire guides, and independent means interconnecting said wire guides and said drive mechanism whereby to wind different shapes of coils on said first and second winding forms simultaneously.

2. A coil winding machine comprising a winding shaft mounted for rotation about its axis, a first pair of winding forms mounted upon said winding shaft, a second pair of winding forms mounted upon said winding shaft, a first pair of wire guides mounted adjacent said first pair of winding forms for reciprocation in a direction parallel to the axis of rotation of said shaft, a second pair of wire guides mounted adjacent said second pair of winding forms for reciprocation in a direction parallel to the axis of rotation of said shaft, a first drive mechanism to oscillate said winding shaft about its axis of rotation, a second drive mechanism for said wire guides, a first connecting means interconnecting said second drive mechanism and said first pair of wire guides, and a second connecting means independent of said first connecting means interconnecting said second drive mechanism and said second pair of wire guides whereby to permit winding of coils of different shapes upon said first and second pairs of winding forms.

3. A coil winding machine comprising a winding shaft mounted for rotation about a horizontal axis, a first pair of winding forms mounted upon said winding shaft, a second pair of winding forms mounted upon said winding shaft, a first pair of wire guides mounted adjacent said first pair of winding forms for reciprocation in a direction parallel to the axis of rotation of said shaft, a second pair of wire guides mounted adjacent said second pair of winding forms for reciprocation in a direction parallel to the axis of rotation of said shaft, a first drive mechanism to oscillate said winding shaft about its axis of rotation, a second drive mechanism for said wire guides, a first connecting means adjustably interconnecting said drive mechanism and first pair of wire guides, and a second connecting means independent of said connecting means adjustably interconnecting said second drive mechanism and said second pair of wire guides whereby to permit winding of coils of different shapes upon said first and second pairs of winding forms.

4. A coil winding machine comprising a winding shaft mounted for rotation about the horizontally disposed longitudinal axis thereof, a first pair of winding forms mounted upon said winding shaft, a second pair of winding forms mounted upon said winding shaft and spaced from said first pair of winding forms, a first pair of wire guides mounted above said first pair of winding forms and extending downwardly to said first pair of winding forms for reciprocation in a direction parallel to the axis of rotation of said shaft, a second pair of wire guides mounted below said second pair of winding forms and extending upwardly adjacent thereto for reciprocation in a direction parallel to the axis of rotation of said shaft, a first drive mechanism to oscillate said winding shaft about its axis of rotation, a second drive mechanism for said wire guides, a first connecting means adjustably interconnecting said second drive mechanism and said first pair of wire guides, and a second connecting means independent of said first connecting means adjustably interconnecting said second drive mechanism and said second pair of wire guides whereby to permit winding of coils of different shapes upon said first and second pairs of winding forms.

5. A coil winding machine comprising a winding shaft mounted for rotation about an axis, a first winding form mounted upon said shaft, a second winding form mounted upon said shaft and spaced from said first winding form, a first support rod slidably mounted adjacent said winding shaft for reciprocation in a direction parallel to the axis of rotation of said shaft, a first wire guide mounted upon said first support rod for reciprocation therewith adjacent said first winding form, a second support rod slidably mounted adjacent said winding shaft for reciprocation in a direction parallel to the axis of rotation of said winding shaft, a second wire guide mounted upon said second support rod for reciprocation therewith adjacent said second winding form, drive mechanism to oscillate said winding shaft about its axis of rotation and to reciprocate said support rods, and independent means interconnecting said support rods and said drive mechanism whereby to wind different shapes of coils on said first and second winding forms simultaneously.

6. A coil winding machine comprising a winding shaft mounted for rotation about an axis, a first pair of winding forms mounted upon said winding shaft, a second pair of winding forms mounted upon said winding shaft and spaced from said first pair of winding forms, a first support rod slidably mounted adjacent said winding shaft for reciprocation in a direction parallel to the axis of rotation of said shaft, a first pair of wire guides mounted on said first support rod adjacent said first pair of winding forms, a second support rod slidably mounted adjacent said shaft for reciprocation in a direction parallel to the axis of rotation of said shaft, a second pair of wire guides mounted upon said second support rod for reciprocation therewith adjacent said second pair of winding forms, a first drive mechanism to oscillate said winding shaft about its axis of rotation, a second drive mechanism for said support rods, a first connecting means adjustably interconnecting said second drive mechanism and said first support rod, and a second connecting means adjustably interconnecting said second drive mechanism and said second support rod whereby to permit winding of coils of different shapes upon said first and second pairs of winding forms.

7. A coil winding machine comprising a winding shaft having the axis thereof disposed substantially horizontally and mounted for rotation about said axis, a first pair of winding forms mounted upon said winding shaft, a second pair of winding forms mounted upon said winding shaft and spaced from said first pair of winding forms, a first support rod slidably mounted above said winding shaft for reciprocation in a direction parallel to the axis of rotation of said winding shaft, a first pair of wire guides mounted upon said first support rod for reciprocation therewith and extending downwardly therefrom adjacent said first pair of winding forms, a second support rod slidably mounted below said winding shaft for reciprocation in a direction parallel to the axis of rotation of said winding shaft, a second pair of wire guides mounted upon said second support rod for reciprocation therewith and extending upwardly therefrom adjacent said second set of winding forms, a first drive mechanism to oscillate said winding shaft about its axis of rotation, a second drive mechanism for said support rods, a first connecting means adjustably interconnecting said second drive mechanism and said first support rod, and a second connecting means independent of said first connecting means adjustably interconnecting said second drive mechanism and said second support rod whereby to permit winding of coils of different shapes simultaneously upon said first and second pairs of winding forms.

8. A coil winding machine comprising a frame, a drive shaft mounted upon said frame, a crank driven by said drive shaft, a lever having one end thereof connected eccentrically to said crank, a rack pivotally connected to the other end of said lever and driven thereby, a winding shaft rotatably mounted upon said frame, a gear connected to said winding shaft and in engagement with and driven by said rack to oscillate said winding shaft, a winding form mounted upon said winding shaft, a barrel cam rotatably mounted upon said frame, gear means interconnecting said drive shaft and said barrel cam, a cam track formed in said barrel cam, a pivot shaft mounted adjacent said barrel cam, a cam follower mounted on said pivot shaft and engaging in said cam track to oscillate said pivot shaft when said barrel cam is rotated, a support rod slidably mounted upon said frame adjacent said winding shaft for reciprocation in a direction parallel to the axis of rotation of said winding shaft, a connecting means interconnecting said pivot shaft and said support rod, and a wire guide mounted upon said support rod for reciprocation therewith adjacent said winding form to wind a coil of wire on said winding form.

9. A coil winding machine comprising a frame, a drive shaft mounted upon said frame, a crank driven by said drive shaft, a lever having one end thereof connected eccentrically to said crank, a rack pivotally connected to the other end of said lever and driven thereby, a winding shaft rotatably mounted upon said frame, a gear connected to said winding shaft and in engagement with and driven by said rack to oscillate said winding shaft about the axis thereof, a first winding form mounted upon said winding shaft, a second winding form mounted upon said winding shaft and spaced from said first winding form, a barrel cam rotatably mounted upon said frame, gear means interconnecting said drive shaft and said barrel cam, a cam track formed in said barrel cam, a pivot shaft mounted adjacent said barrel cam, a cam follower mounted on said pivot shaft and engaging in said cam track to oscillate said pivot shaft when said barrel cam is rotated, a support rod slidably mounted upon said frame adjacent said winding shaft for reciprocation in a direction parallel to the axis of rotation of said winding shaft, a connecting means interconnecting said pivot shaft and said support rod, a first wire guide mounted upon said support rod adjacent said first winding form, and a second wire guide mounted upon said support rod adjacent said second winding form.

10. A coil winding machine comprising a frame, a drive shaft mounted upon said frame, a crank driven by said drive shaft, a lever having one end thereof connected eccentrically to said crank, a rack pivotally connected to the other end of said lever and driven thereby, a winding shaft rotatably mounted upon said frame for rotation about its axis, a gear connected to said winding shaft and in engagement with and driven by said rack to oscillate said winding shaft, a first winding form mounted upon said winding shaft, a second winding form mounted upon said winding shaft and spaced from said first winding form, a barrel cam rotatably mounted upon said frame, gear means interconnecting said drive shaft and said barrel cam, a cam track formed in said barrel cam, a pivot shaft mounted adjacent said barrel cam, a cam follower mounted on said pivot shaft and engaging in said cam track to oscillate said pivot shaft when said barrel cam is rotated, a first support rod slidably mounted upon said frame adjacent said winding shaft for reciprocation in a direction parallel to the axis of rotation of said winding shaft, a first connecting means interconnecting said pivot shaft and said first support rod, a first wire guide mounted upon said first support rod for reciprocation therewith adjacent said first winding form to wind a coil of wire thereon, a second support rod slidably mounted upon said frame adjacent said winding shaft for reciprocation in a direction parallel to the axis of rotation of said winding shaft, a second connecting means interconnecting said pivot shaft and said second support rod, and a second wire guide mounted upon said second support rod for reciprocation therewith adjacent said second winding form to wind a coil of wire thereon.

11. A coil winding machine comprising a frame, a drive shaft mounted upon said frame, a crank driven by said drive shaft, a lever having one end thereof connected eccentrically to said crank, a rack pivotally connected to the other end of said lever and driven thereby, a winding shaft rotatably mounted upon said frame for rotation about its axis, a gear connected to said winding shaft and in engagement with and driven by said rack to oscillate said winding shaft, a first winding form mounted upon said winding shaft, a second winding form mounted upon said winding shaft and spaced from said first winding form, a barrel cam rotatably mounted upon said frame, gear means interconnecting said drive shaft and said barrel cam, a cam track formed in said barrel cam, a pivot shaft mounted adjacent said barrel cam, a cam follower mounted on said pivot shaft and engaging in said cam track to oscillate said pivot shaft when said barrel cam is rotated, a first support rod slidably mounted upon said frame adjacent said winding shaft for reciprocation in a direction parallel to the axis of rotation of said winding shaft, a first connetuing means adjustably interconnecting said pivot shaft and said first support rod, a first wire guide mounted upon said first support rod for reciprocation therewith adjacent said first winding form to wind a coil of wire thereon, a second support rod slidably mounted upon said frame adjacent said winding shaft for reciprocation in a direction parallel to the axis of rotation of said winding shaft, a second connecting means adjustably interconnecting said pivot shaft and said second support rod, and a second wire guide mounted upon said second support rod for reciprocation therewith adjacent said second winding form to wind a coil of wire thereon, said adjustable connecting means being independent of each other and permitting winding of coils of different shapes upon said first and second winding forms.

12. A coil winding machine comprising a frame, a drive shaft mounted upon said frame, a crank driven by said drive shaft, a lever having one end thereof connected eccentrically to said crank, a rack pivotally connected to the other end of said lever and driven thereby, a winding shaft rotatably mounted upon said frame with the longitudinal axis thereof disposed substantially horizontally, a gear connected to said winding shaft and in engagement with and driven by said rack to oscillate said winding shaft, a first winding form mounted upon said winding shaft, a second winding form mounted upon said winding shaft and spaced from said first winding form, a barrel cam having a cam track formed therein and rotatably mounted upon said frame, gear means interconnecting drive shaft and said barrel cam, a pivot shaft mounted adjacent said barrel cam, a cam follower mounted on said pivot shaft and engaging in said cam track to oscillate said pivot shaft when said barrel cam is rotated, a first support rod slidably mounted upon said frame above said winding shaft for reciprocation in a direction parallel to the axis of rotation of said winding shaft, a first connecting means interconnecting said pivot shaft and said first support rod, a first wire guide mounted upon said first support rod for reciprocation therewith and extending downwardly therefrom adjacent said first winding form to wind a coil of wire thereon, a second support rod slidably mounted upon said frame beneath said winding shaft for reciprocation in a direction parallel to the axis of rotation of said winding shaft, a second connecting means interconnecting said pivot shaft and said second support rod, and a second wire guide mounted upon said second support rod for reciprocation therewith and extending upwardly therefrom adjacent said second winding form to wind a coil of wire thereon.

13. A coil winding machine comprising a frame, a drive shaft mounted upon said frame, a crank driven by said drive shaft, a lever having one end thereof connected eccentrically to said crank, a rack pivotally connected to the other end of said lever and driven thereby, a winding shaft rotatably mounted upon said frame with the longitduinal axis thereof disposed substantially horizontally, a gear connected to said winding shaft and in engagement with and driven by said rack to oscillate said winding shaft, a first winding form mounted upon said winding shaft, a second winding form mounted upon said winding shaft and spaced from first winding form, a barrel cam having a cam track formed therein and rotatably mounted upon said frame, means interconnecting said drive shaft and said barrel cam, a pivot shaft mounted adjacent said barrel cam, a cam follower mounted on said pivot shaft and engaging in said cam track to oscillate said pivot shaft when said barrel cam is rotated, a first support rod slidably mounted upon said frame above said winding shaft for reciprocation in a direction parallel to the axis of rotation of said winding shaft, a first connecting means adjustably interconnecting said pivot shaft and said first support rod, a first wire guide mounted upon said first support rod for reciprocation therewith and extending downwardly therefrom adjacent said first winding form to wind a coil of wire thereon, a second support rod slidably mounted upon said frame beneath said winding shaft for reciprocation in a direction parallel to the axis of rotation of said winding shaft, a second connecting means adjustably interconnecting said pivot shaft and said second support rod, and a second wire guide mounted upon said second support rod for reciprocation therewith and extending upwardly therefrom adjacent said second winding form to wind a coil of wire thereon, said adjustable connecting means being independent of each other to permit winding of coils of different types upon said first and second winding forms.

14. A coil winding machine comprising a frame, a drive shaft mounted upon said frame, a crank driven by said drive shaft, a lever having one end thereof connected eccentrically to said crank, a rack pivotally connected to the other end of said lever and driven thereby, a winding shaft rotatably mounted upon said frame, a gear connected to said winding shaft and in engagement with and driven by said rack to oscillate said winding shaft, a first pair of winding forms mounted upon said winding shaft, a second pair of winding forms mounted upon said winding shaft and spaced from said first pair of winding forms, a barrel cam rotatably mounted upon said frame, gear means interconnecting said drive shaft and said barrel cam, a cam track formed in said barrel cam, a pivot shaft mounted adjacent said barrel cam, a cam follower mounted on said pivot shaft and engaging in said cam track to oscillate said pivot shaft when said barrel cam is rotated, a first support rod slidably mounted upon said frame adjacent said winding shaft for reciprocation in a direction parallel to the axis of rotation of said winding shaft, a first connecting means adjustably interconnecting said pivot shaft and said first support rod, a first pair of wire guides mounted upon said first support rod for reciprocation therewith adjacent said first pair of winding forms to wind coils thereon, a second support rod slidably mounted upon said frame adjacent said winding shaft for reciprocation in a direction parallel to the axis of rotation of said winding shaft, a second connecting means adjustably interconnecting said pivot shaft and said second support rod, and a second pair of wire guides mounted upon said second support rod for reciprocation therewith adjacent said second pair of winding forms to wind coils thereon.

15. A coil winding machine comprising a winding shaft mounted for rotation about an axis, a first winding form mounted upon said shaft, a second winding form mounted upon said shaft and spaced from said first winding form, each of said winding forms including a first form member having a part cylindrical outer surface and a pair of flanges extending outwardly from said outer surface, a second substantially U-shaped form member disposed between said flanges, a quickly operable fastener interconnecting said form members, a first wire guide mounted adjacent to said first winding form for reciprocation in a direction parallel to the axis of rotation of said winding shaft, a second wire guide mounted adjacent to said second winding form for reciprocation in a direction parallel to the axis of rotation of said first shaft, drive mechanism to oscillate said winding shaft about its axis of rotation and to reciprocate said wire guides to wind a coil between said form members and upon said part cylindrical outer surface between said flanges, and independent means interconnecting said wire guides and said drive mechanism whereby to wind different shapes of coils on said first and second winding forms simultaneously.

References Cited in the file of this patent

UNITED STATES PATENTS

| | | |
|---|---|---|
| 1,236,464 | Marcroft | Aug. 14, 1917 |
| 1,411,140 | Vester | Mar. 28, 1922 |
| 1,431,947 | Gysel | Oct. 17, 1922 |
| 2,030,988 | Hofstetter | Feb. 18, 1936 |
| 2,132,933 | Bowman | Oct. 11, 1938 |
| 2,319,485 | Alabrune | May 18, 1943 |
| 2,453,749 | Hilsinger | Nov. 16, 1948 |
| 2,496,913 | Grundmann | Feb. 7, 1950 |
| 2,533,506 | Richard | Dec. 12, 1950 |
| 2,543,370 | Kludt | Feb. 27, 1951 |
| 2,565,331 | Torsch | Aug. 21, 1951 |
| 2,614,588 | Laycock | Oct. 21, 1952 |
| 2,624,518 | Scofield | Jan. 6, 1953 |

FOREIGN PATENTS

| | | |
|---|---|---|
| 1,009,509 | France | Mar. 12, 1952 |
| 155,433 | Australia | July 10, 1952 |

UNITED STATES PATENT OFFICE
CERTIFICATION OF CORRECTION

Patent No. 2,964,068                      December 13, 1960

Nelson T. Van Voorst

It is hereby certified that error appears in the above numbered patent requiring correction and that the said Letters Patent should read as corrected below.

Column 7, line 66, for "480" read -- 380 --; column 11, line 56, for "connetuing" read -- connecting --.

Signed and sealed this 30th day of May 1961.

(SEAL)
Attest:

ERNEST W. SWIDER                      DAVID L. LADD

Attesting Officer                       Commissioner of Patents